United States Patent
Tuli

(10) Patent No.: US 10,841,533 B2
(45) Date of Patent: Nov. 17, 2020

(54) TELEPRESENCE SYSTEM WITH VIRTUAL REALITY

(71) Applicant: Raja Singh Tuli, Montreal (CA)

(72) Inventor: Raja Singh Tuli, Montreal (CA)

( * ) Notice: Subject to any disclaimer, the term of this patent is extended or adjusted under 35 U.S.C. 154(b) by 0 days.

(21) Appl. No.: 15/934,728

(22) Filed: Mar. 23, 2018

(65) Prior Publication Data
US 2020/0213558 A1 Jul. 2, 2020

(51) Int. Cl.
| H04N 7/15 | (2006.01) |
| H04N 13/383 | (2018.01) |
| G02B 27/01 | (2006.01) |
| H04N 5/232 | (2006.01) |
| H04N 7/18 | (2006.01) |

(52) U.S. Cl.
CPC ........... *H04N 7/15* (2013.01); *G02B 27/0172* (2013.01); *H04N 5/23238* (2013.01); *H04N 7/181* (2013.01); *H04N 13/383* (2018.05)

(58) Field of Classification Search
USPC ........................................ 348/14.01–14.09
See application file for complete search history.

(56) References Cited

U.S. PATENT DOCUMENTS

| 6,133,944 | A | 10/2000 | Braun et al. |
| 7,190,392 | B1 | 3/2007 | Maguire, Jr. |
| 2007/0182812 | A1 | 8/2007 | Ritchey |
| 2012/0044365 | A1* | 2/2012 | Shuster .................. A63F 13/53 348/207.1 |
| 2013/0076599 | A1* | 3/2013 | Saito ..................... G02B 27/017 345/8 |
| 2014/0146132 | A1* | 5/2014 | Bagnato ................. G02B 30/34 348/36 |
| 2017/0115488 | A1 | 4/2017 | Ambrus et al. |
| 2017/0351327 | A1* | 12/2017 | Yasuda ................... G06F 3/038 |
| 2017/0358141 | A1 | 12/2017 | Stafford et al. |
| 2018/0007258 | A1* | 1/2018 | Seko .................. H04N 5/23293 |
| 2018/0147483 | A1* | 5/2018 | Osman .................... A63F 13/00 |
| 2018/0196512 | A1* | 7/2018 | Kim ........................ G06F 3/013 |
| 2018/0260187 | A1* | 9/2018 | Yasuda .................. H04M 11/06 |

* cited by examiner

*Primary Examiner* — Maria El-Zoobi

(57) ABSTRACT

A telepresence system that provides a 360 degree video of a remote location to user through a head mounted display, thus providing a virtual reality experience of the remote location. The present system detects the head movement of the user and basis that moves a camera to record video of a corresponding part of the remote location in high resolution. The high resolution images from the camera is overlaid with the 360 degree video of the remote location and provided to the user. Thus, the user can view of a high resolution video of the remote location wherein only a part of the remote location that the user is viewing is provided in high resolution and rest are in low resolution. Thus the telepresence system as discussed in this invention helps in reducing bandwidth required for providing a high resolution telepresence system.

18 Claims, 10 Drawing Sheets

TELEPRESENCE SYSTEM WITH VIRTUAL REALITY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND

Field of the Invention

The present invention relates generally to videoconferencing and more specifically to a telepresence system with specific features such as providing a high-resolution telepresence experience requiring reduced bandwidth and data transfer.

Description of Related Art

Driven by globalization of business organizations and decentralization of workforce, demands of video conferencing services and equipment are in rapid expansion in multinational corporate enterprises. In recent years, video conferencing has become widely adopted by public sectors and healthcare sectors as an effective form of communication between remote users. However, messages delivered by video conferencing is not as effectively as it is in a face-to-face conversation, particularly in a sense that subtle non-verbal communication cues such as eye contact, eye gaze and interpersonal distance, are often overlooked or impossible to be replicated in video conferencing. By contrast, people engaged in a face-to-face conversation tend to frequently keep an eye contact with others within an interpersonal distance.

In most video conferencing systems and telepresence systems, cameras or image sensors, which capture an image of the interacting subject, are often located above or at the periphery of the monitor, which displays an image of the remote user. It is evident that even a user is intended to look into the eyes of an interacting subject's image in the monitor will appeared to be looking down in the interacting subject's perspective when the camera is placed atop the monitor. Similarly, the user will appear to be gazing to a side when the camera is placed on the side of the monitor, or will appear to be looking up when the camera is placed below the monitor. As a result of this camera orientation issue, the user's gaze direction shown in the subject's monitor will appeared different from his actual intention. However, adjustments on the images are often neglected in these systems. These systems, therefore, are insufficient for preserving gaze direction or maintaining eye contact between users.

Telepresence robotic system remains one of the most realistic two-way interactive video conferencing available on the market hitherto because it overcomes physical distance while assists to create a sense of presence of a remote user to enable social communication. Advancements have been made to improve the interaction between users, particularly, to permit eye contact between the user and the interacting subject via a telepresence device. Proposed methodologies in these advancements include manoeuvring the head of the telepresence device to face the direction of a user's voice, and using a semi-silvered mirror or a beamsplitter panel that allows mounting a camera directly behind to provide an apparent eye contact between the user's image and the interactive subject. Another teaching reveals a telepresence system that relies on a projected life size image of the surrogate's location to preserve the user perspective and a vertical gaze. Another teaching uses 3D reconstruction technique to re-center both the head and the eye position of the user's image in the telepresence device display.

However, these telepresence systems have their limitations in terms of ease of use, affordability and overall user experience. For example, there is a need of heavy computation and networking resources to render and transmit the high resolution life size background image, the user's intended gaze direction is not truly preserved and there are inherent issues of beamsplitter, such as degraded image quality by ambient light and bulkiness of the setup that restricts the mobility of a user to a specific physical location where the beamsplitter is installed beforehand.

More recently, a telepresence robotic (E-Travel) system has been developed that provides user with a 360 degree view of a remote location. Such systems generally use head mounted displays where the user can experience the remote location in virtual reality. Such systems generally require lot of data transfer and thus consume tremendous bandwidths. Most of such systems do not take into account that bandwidth limitation is a problem that still exists and thus, there can be significant lags between a user wearing a head mounted display and the camera sending image to the head mounted display.

Accordingly, in order to have a better virtual reality experience of a remote location, the bandwidth of the network implementing the whole system needs to be optimized. None of the existing technologies considers network into their systems and hence, require betterment to work around the limitations of network bandwidth.

BRIEF SUMMARY OF THE INVENTION

The present invention discloses a telepresence system that provides user with a virtual reality experience. The telepresence system as per the present invention provides live streaming of 360 degree view of a remote location. The telepresence system as per the present invention comprises of a remote camera system and a head mounted display. The purpose of the present invention is to reduce the amount of data transmitted between the camera system and the head mounted display. The camera system captures 360 degree view of a remote location and transmits the same to a head mounted display, where the 360 degree view of the remote location is presented to a user wearing the head mounted display. The camera system is designed to capture live images or videos of the remote location so that the user can view the present state of the remote location. For optimum performance of any telepresence system, a user should be provided with high resolution live video of the remote location. Transferring high resolution live video requires large bandwidth. In existing telepresence systems, when a user wears a head mounted display, the user can view only a certain area of the 360 degree live feed. Thus, a lot of the bandwidth gets wasted in transmitting high resolution live feed that are beyond user's viewing range. The telepresence system as per one of the embodiment of the present invention reduces bandwidth required for providing a high definition 360 degree live feed of a remote location using a virtual reality head mounted display. As per one of the embodiment of the present invention, the camera system comprises of a high definition camera that captures live video feeds and a set of cameras capturing 360 degree view of the remote location. The head mounted display have in-built sensors that detect head movement and direction of the user and provides high definition live feeds only for the viewing range of the user. The rest of the viewing area of the head mounted display is provided with low resolution video feeds. Thus, overall bandwidth required for providing an overall high resolution telepresence system is reduced.

Details of one or more implementations of the disclosure are set forth in the accompanying drawings and the description below. Other aspects, features, and advantages will be apparent to those skilled in the art from reading of the following description and drawings, and from the claims.

BRIEF DESCRIPTION OF THE DRAWINGS

This invention will be better appreciated from a consideration of the detailed description of non-limiting embodiments presented herein below with reference to the accompanying drawings, in which.

DETAILED DESCRIPTION OF THE INVENTION

Figure 1A:
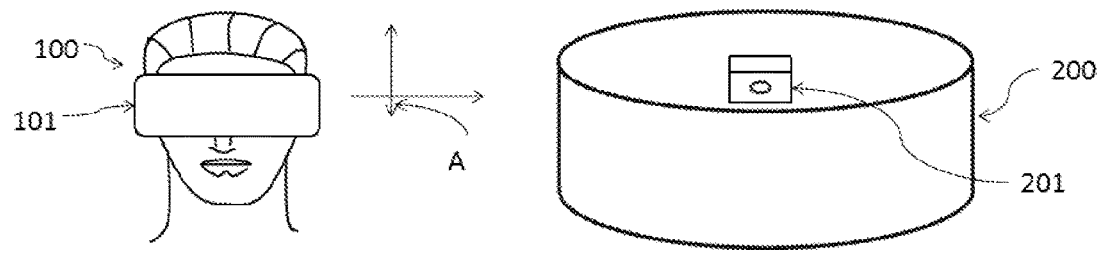
FIG. 1A-1C are illustrations of the preferred embodiment of the telepresence system in this invention wherein movement of a user's head causes movement of a camera in a camera system.

The present invention discloses a telepresence system that provides user with a virtual reality experience. The telepresence system as per the present invention provides live streaming of 360 degree view of a remote location. The telepresence system as per the present invention comprises of a remote camera system and a head mounted display. The purpose of the present invention is to reduce the amount of data transmitted between the camera system and the head mounted display. The camera system captures 360 degree view of a remote location and transmits the same to a head mounted display, where the 360 degree view of the remote location is presented to a user wearing the head mounted display. The camera system is designed to capture live images or videos of the remote location so that the user can view the present state of the remote location. For optimum performance of any telepresence system, a user should be provided with high resolution live video of the remote location. Transferring high resolution live video requires large bandwidth. In existing telepresence systems, when a user wears a head mounted display, the user can view only a certain area of the 360 degree live feed. Thus, a lot of the bandwidth gets wasted in transmitting high resolution live feed that are beyond user's viewing range. The telepresence system as per one of the embodiment of the present invention reduces bandwidth required for providing a high definition 360 degree live feed of a remote location using a virtual reality head mounted display. As per one of the embodiment of the present invention, the camera system comprises of a high definition camera that captures live video feeds and a set of cameras capturing 360 degree view of the remote location. The head mounted display have in-built sensors that detect head movement and direction of the user and provides high definition live feeds only for the viewing range of the user. The rest of the viewing area of the head mounted display is provided with low resolution video feeds. Thus, overall bandwidth required for providing an overall high resolution telepresence system is reduced.

As per yet another embodiment of the present invention, the system can be applied without a head mounted display. A computer or a laptop can also be present that can be used to display the live video feeds coming from the camera system and display the same. A user can be provided with a graphical user interface where the user can scroll, click or drag to see a 3D view of a remote location s captured by the camera system. Similarly, the invention can also be implemented in a small form factor device like smart watch and smart phones where also, the user can interact with the device to see the full 3D view of the remote location as captured by the camera system. Further, the same can be implemented in any other sort display screens providing a 3D view of the remote location. In such systems, a camera or other types of sensors can also implemented to recognize user's gesture to interact with the video coming from the camera system.

Figure 1B:
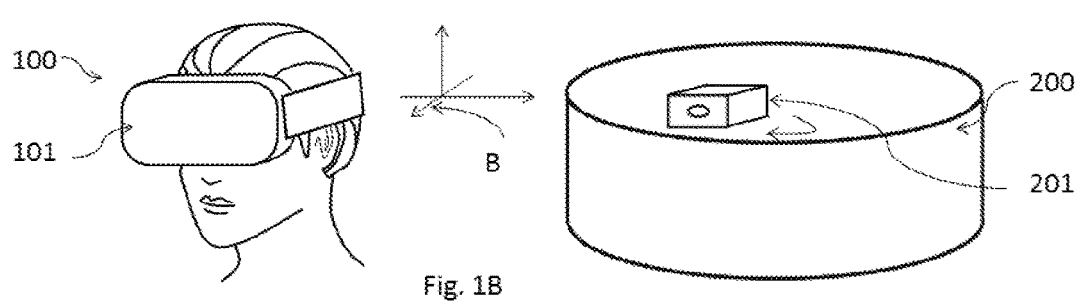
Figure 1C:
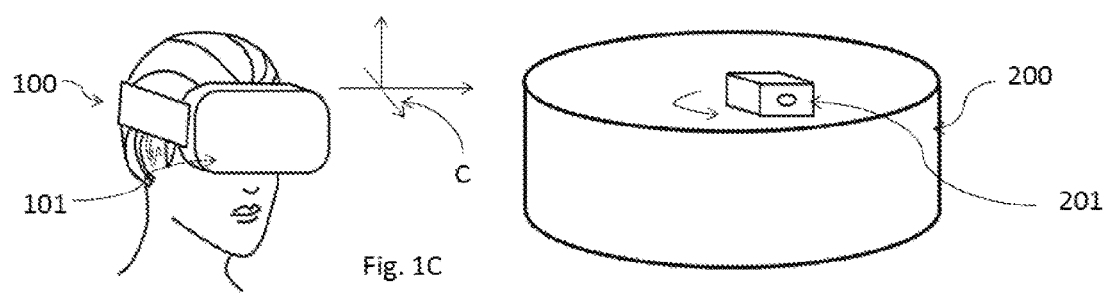

FIG. 1A-1C illustrates a telepresence system as per one of the embodiment of the primary invention. The telepresence system comprises of a head mounted display 101 that can be worn by a user 100. The telepresence system further comprises of a camera system 200 that captures and transmits 360 degree view of a live feed. The camera system 200 further comprises of a high resolution camera 201. The head mounted display 101 is further provided with sensors that can detect direction in which the user 100 is viewing and also the movement of the user's head. The direction and movement of the user head is transferred through a network to the camera system 200, so that the high resolution camera 201 is aligned as per the direction of the user's head. The head mounted display 101 provides a 360 degree view of a remote location, where the camera system 200 is present. The camera system 200 generally has multiple cameras capturing videos at different directions. The collective field of view of the cameras should cover 360 degree space while having enough overlap for stitching purposes. The video streams from all these cameras are synchronized, stitched and projected on a sphere. Then, the video is mapped using any of the already known in the art sphere to plane mapping, compressed and send to the head mounted display 101 for the user to view. While doing processing of the video streams from multiple cameras, the videos feed of high resolution camera 201 is either stitched or overlaid along with the video feed from the other cameras of the camera system 200. Thus, when the user 100 is using the head mounted display 101, the user can see a high resolution feed of live video for the direction in which the user's head is positioned. Rests of the video feed is in lower resolution as captured by the other cameras of the camera system 200. The direction of the user's head is detected by the head mounted display 101 and transmitted to the camera system 200. The camera system 200 then moves the high resolution camera 201 to capture video in high resolution in the direction of the user's head. Thus, field of view of the high resolution camera 201 is aligned with the direction of the user's head. As shown in FIG. 1A, when the user 100 is looking at direction A, the high resolution camera 201 is also facing direction A. When the user rotates its head left towards direction B, the high resolution camera 201 also moves to align itself to direction B. This is shown in FIG. 1B. Similarly, when the user 100 rotates head right to direction C, the high resolution camera 201 is moved so that it is facing direction C. Using this system, high resolution feed is captured and transmitted only for the viewing range of the user 100, while rest of the 360 degree is provided with lower resolution video feeds. Even when the user 100 turns its head up or down, the high resolution camera 201 is moved to mimic the movement of the user's head and capture live video in high resolution in that particular direction. Thus, the overall experience of a high resolution virtual reality telepresence system is provided to the user 100 with a comparatively lower bandwidth requirement as now only a small portion of the entire 360 degree live feed is transmitted in high-resolution.

Figure 2A:
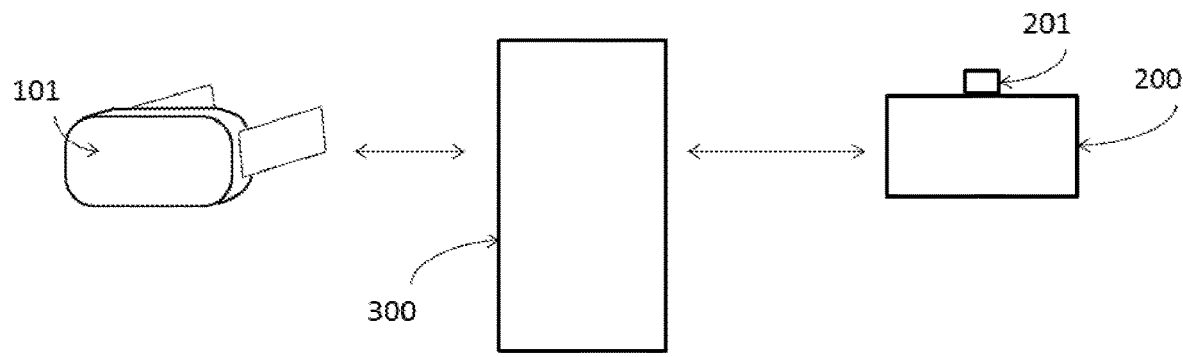
FIG. 2A-2B are illustrations of exemplary networks over which the telepresence system can operate.
Figure 2B:
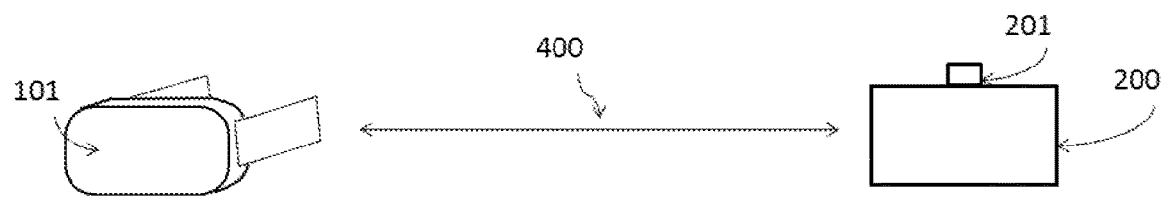

FIG. 2A-2B illustrates exemplary network implementing the telepresence system. As per one of the embodiment of the present invention, a server 300 is utilized which receives the video feeds from the camera system 200 and the high resolution camera and processes the video feed to provide a 360 degree live video feed on the virtual reality head mounted display 101. This is illustrated in FIG. 2A. The server 300 also receives information about direction and movement of the user's head and processes the information to identify the direction and amount of movement required for the high resolution camera 201 to align itself. The above information is then transmitted to the camera system 200 so that the high resolution camera 201 is aligned as per the same direction as the user's head. The server 300, the head mounted display 101, the camera system 200 and high resolution camera 201 are connected to each other via wired or wireless communication networks. A combination of wired and wireless system can also exist to provide connectivity between all the components of the present invention. Further, some or all of the components can be located at the same location also. FIG. 2B illustrates another embodiment of the present invention, where the head mounted display 101 is directly connected to the camera system 200 and the high resolution camera 201 over a network. The network can be wired or wireless communication network already known in the art. As per this embodiment of the present invention, processing of the video feeds from all the cameras of the camera system 200 and the high resolution camera 201 are performed either by the camera system 200 or by the head mounted display 101. Similarly, the information from various sensors present on the head mounted display 101 is processed either by the camera system 200 or by the head mounted display 101. Based on that information from the sensors, the high resolution camera 201 is moved to provide high resolution live feed to the head mounted display 101. As per yet another embodiment of the present invention, the processing of all the video feeds can be shared between the camera system 200 and the head mounted display 101. Further, the calculation of direction and movement of the high resolution camera 201 can also be shared by the camera system 200 and the head mounted display 101. It must be noted here that each individual camera of the camera system including the high resolution camera 201, can be a three-dimensional camera also, where there are two cameras inbuilt into one to generate three-dimensional image.

Figure 3A:
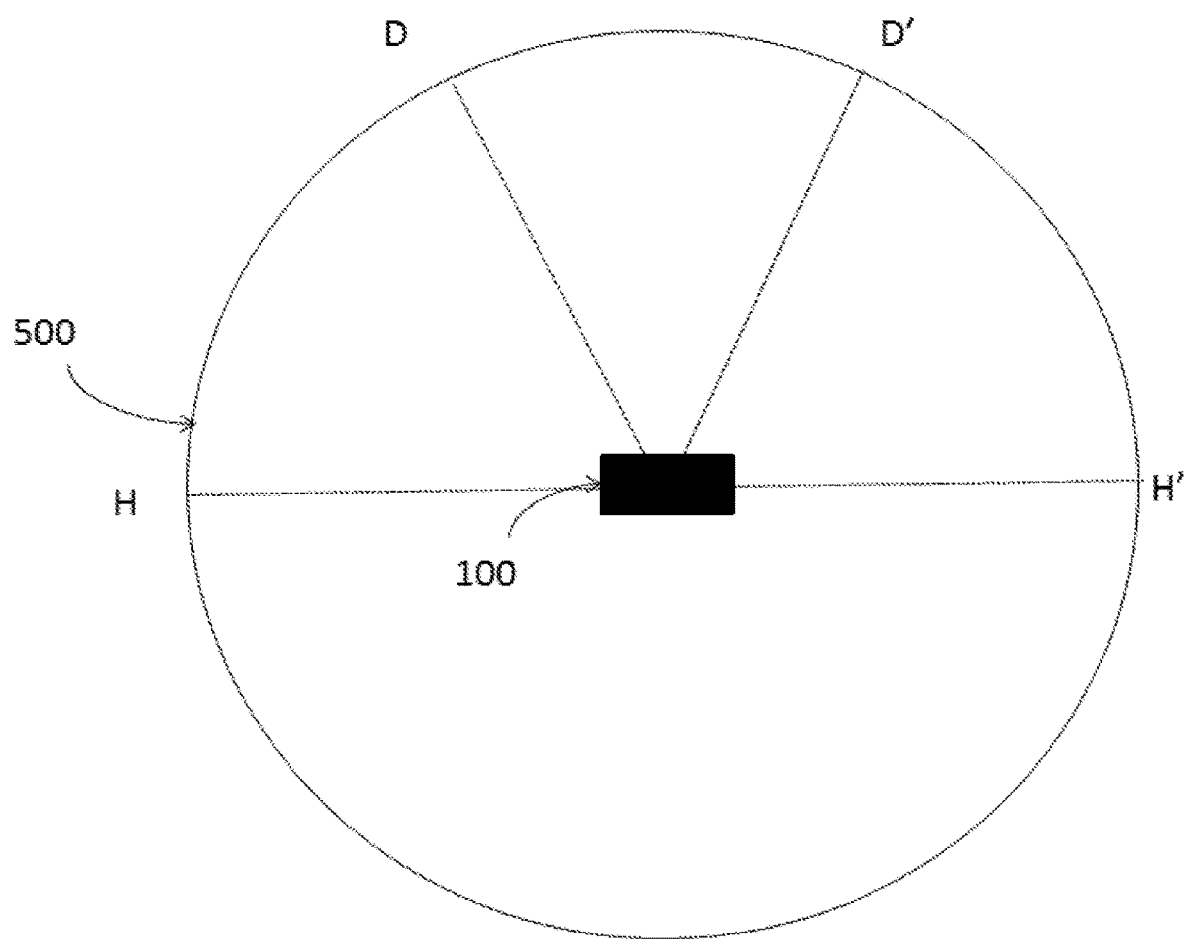
FIG. 3A-3C are illustrations of viewing area of a user using the telepresence system as per one of the embodiment of the present invention.
Figure 3B:
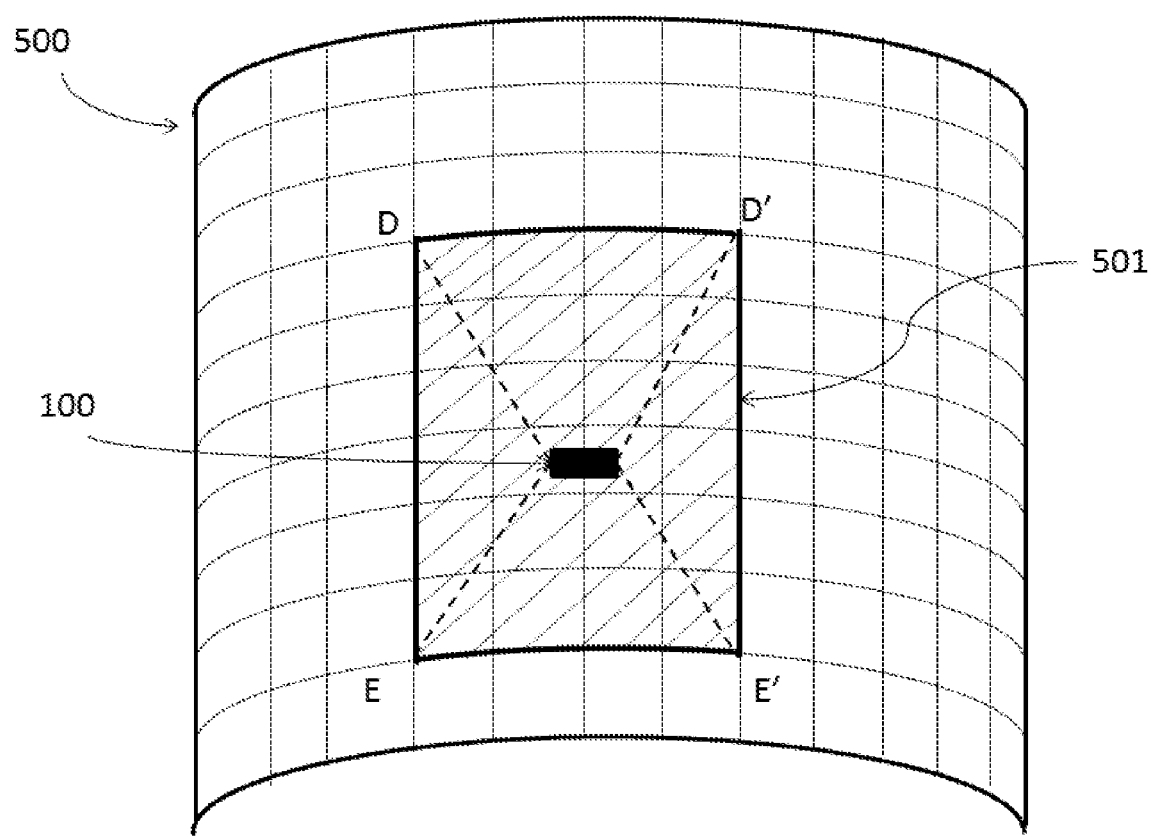
Figure 3C:
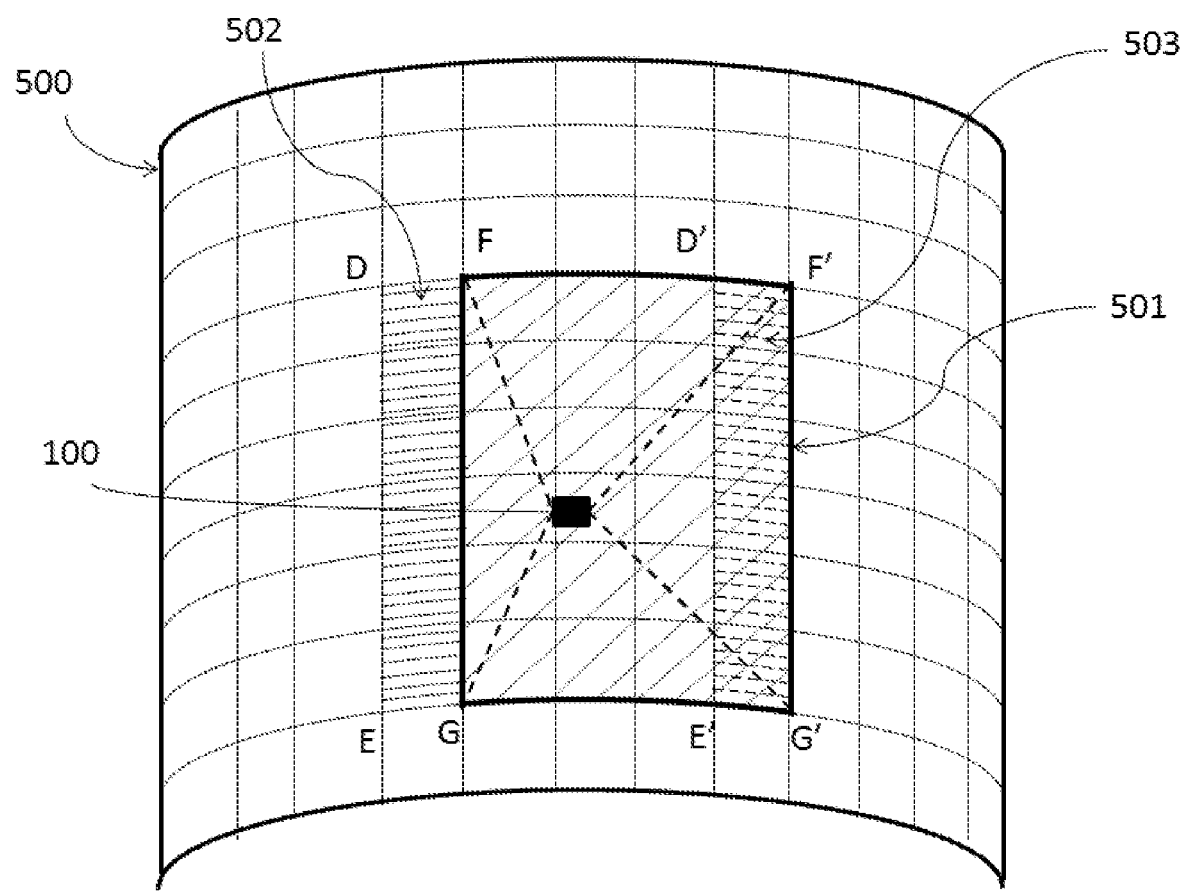

FIG. 3A-3C illustrates the operation of the telepresence system as per one of the embodiment of the present invention. FIG. 3A shows viewing angle of a user 100 wearing a head mounted display 101. The circle 500 shows the entire 360 degree live feed received from camera system 200. A user's total viewing angle is around 180 degrees as depicted by the curve H-H'. However, out of the total 180 degrees, a user has only 120 degree of peripheral vision and only 60 degree of 3D vision. The field of 3D vision is depicted by the curve D-D'. Hence, only 60 degree of the 360 degree live feed 500 is being viewed by the user 100 with full 3D experience. Thus, only a video feed covering the 60 degree live view should be provided with high resolution video stream for the user to have a live virtual reality experience. Rest of the video feed if transmitted in high resolution is actually wasted as user 100 is not looking into them. Thus, the present invention provides a high resolution video feed from the high resolution camera 201 for a viewing range that covers range of 3D vision. Rest of the video feed is provided in lower resolution. Thus, the total bandwidth required for transmission of 360 live video feed is reduced, and yet the user 100 is provided with a high resolution telepresence experience.

FIG. 3B illustrates a part of the 360 degree curve 500 viewed by the user 100. At a time user can view an area D-D'-E-E' of the total 360 degree viewing area. The area is represented by 501. Hence, only the portions of the curve that is within the viewing range of the user is provided with high resolution video feed and rest of the area of the curve 500 is provided with lower resolution video feed. The location of the area 501 can be calculated by determining the direction of the user's head and the angle at which the user head is present. Thus, as mentioned earlier, high resolution video feed from the high resolution camera 201 is either overlaid on the other video streams coming from the other cameras of the camera system 200, or the high resolution video feed is stitched together with the other video streams. When the head of the user 100 is moved, the location of the area 501 that needs to be provided with high resolution video feed also changes. This is shown in FIG. 3C, when the user 100 is looking at a different direction, the viewing area 501 changes its location form D-D'-E-E' to F-F'-G-G'. The shifting in position of the viewing area 501 is processed by the telepresence system and thus, the high resolution camera 201 is moved to capture high resolution video in that direction. The high resolution video feed is then either stitched or overlaid to display high resolution video to the user 100. Thus, the area 502 of the curve 500 which was previously provided with high resolution video feed will now be replaced with lower resolution video feed as it is now beyond the viewing range 501 of the user 100. Similarly, the user 100 can move in up and down direction also which will allow the viewing range 501 to be at any location within the 360 degree view if the virtual reality.

Another feature of the invention is that when the user 100 moves head towards a new direction, information about movement of the head is passed on to the camera system 200. As mentioned earlier, such transmission of information can happen either directly or indirectly through a network server 300. Based on the information received by the camera system 200, the high resolution camera 201 is moved to mimic the movement of the head and then, high resolution images of a new location is transmitted to the user 100. The entire process takes time and as a result there is a small delay. During this process, for a new viewing area, the viewing are is provided with low resolution images that are captured by the other cameras of the camera system 200. Thus, when the viewing area 501 changes its location form D-D'-E-E' to F-F'-G-G', the area 503 between D'-F'-G'-E' will be first provided with low resolution images. Slowly the low resolution images of the area 503 will be replaced by high resolution images captured by the high resolution camera 201 of the new location. Thus, for the user 100 changing its head position, part of the viewing area that was within the viewing area of previous head position will be in high resolution and a part of the viewing area that is new will be first provided with low resolution images that gets replaced by high resolution images over a period of time.

Figure 4A:
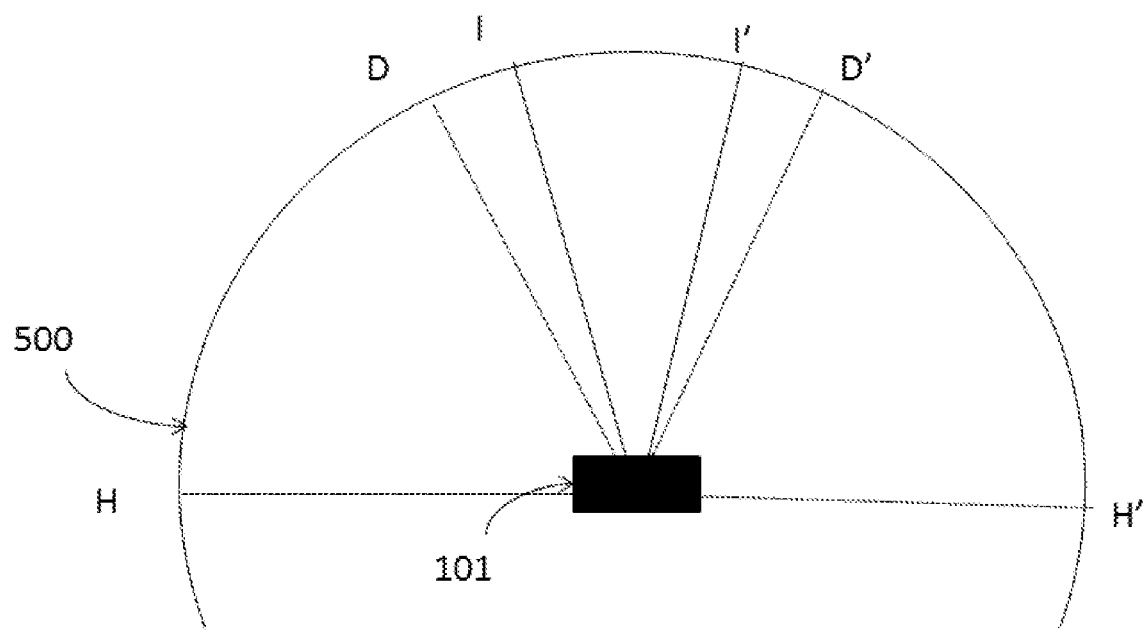
FIG. 4A-4C are illustrations of viewing area of a user using the telepresence system as per yet another embodiment of the present invention.
Figure 4B:
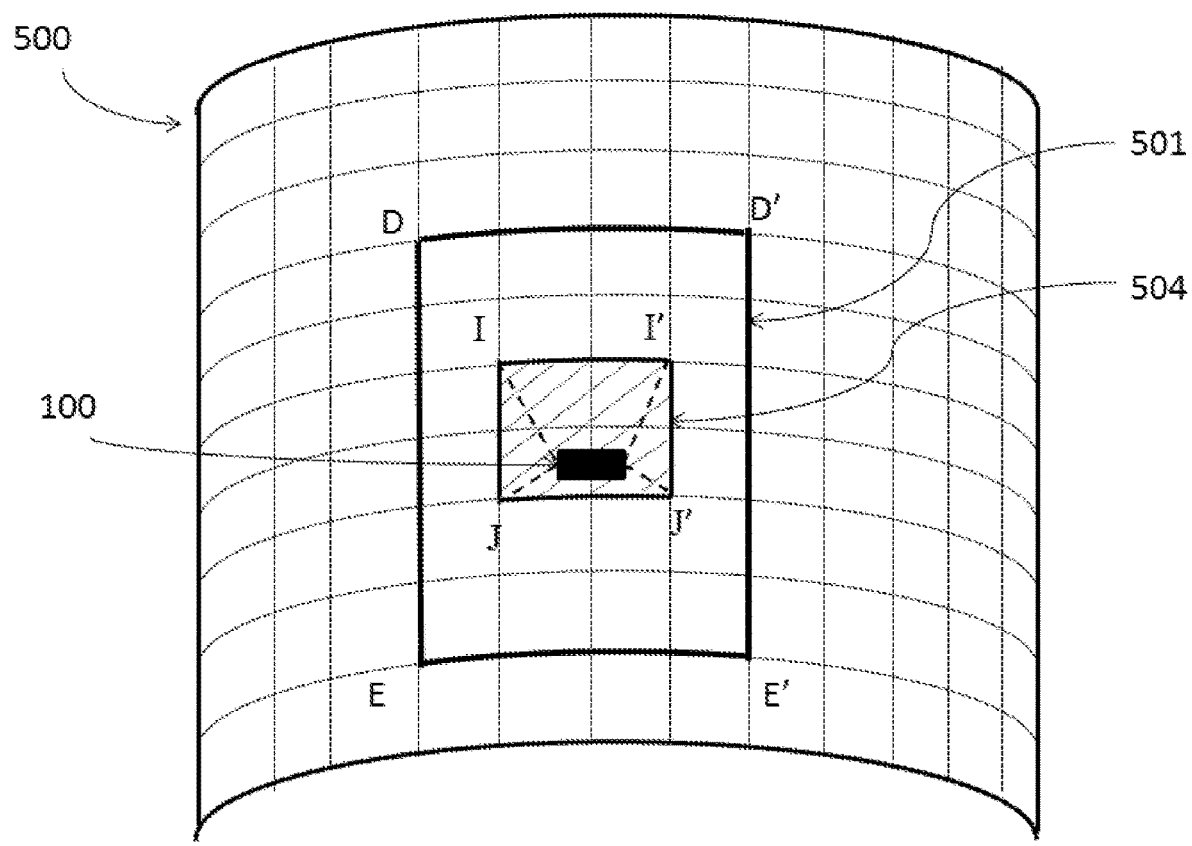
Figure 4C:
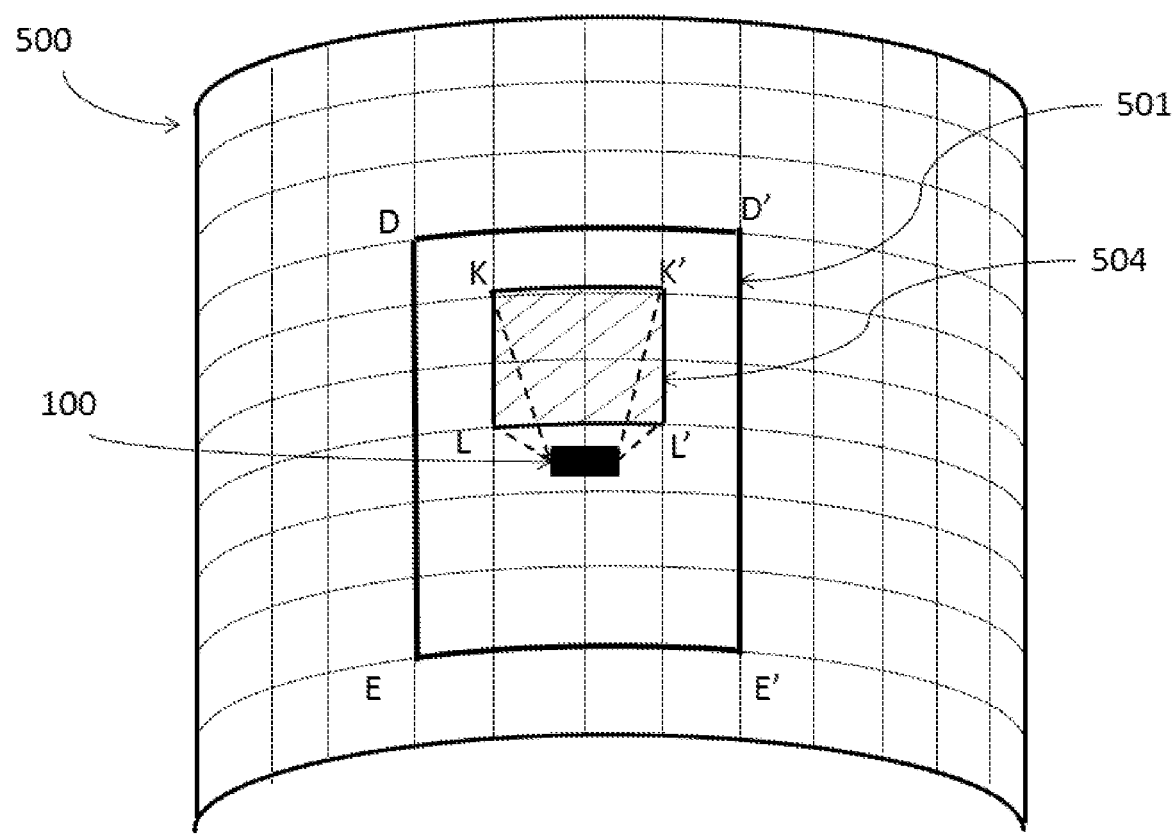

As per yet another embodiment of the present invention, gaze of the user 100 can be tracked to provide a more optimized high resolution video feed. This is explained using FIG. 4A-4C. The head mounted display 101 can be provided with various sensors that can track the gaze of the user 100. Generally within the 3D view range of the user 100, focus of the user 100 is within a very small area, generally around 30 degree. FIG. 4A depicts the viewing range and focus range of the user 100. As you can see, within a 3D viewing range shown by the curve D-D', user 100 can focus on a smaller are shown by E-E'. As user 100 can change focus without moving head, the focus area E-E' can change its location within the curve D-D'. The focus of the user 100 can be identified by tracking the gaze of the user 100. The head mounted display 101 is mounted with various cameras that can track the gaze of the user 100. Basis on identifying gaze of the user 100, only a small portion of the 360 degree video feed can be provided with high resolution feed. This is explained using FIG. 4B-4C. Within the viewing area 501 of the total 360 degree view 500, a small portion I-I'-J-J' is actually where the focus of the user 100 is. That area I-I'-J-J' is identified by tracking the gaze of the user 100 and is represented by 504. As per this embodiment of the present invention, only the area 504 is provided with high resolution video feed instead of the area 501. Thus, lesser bandwidth is required. When the user 100 changes location of focus without movement of the head, the sensors present in the head mounted display 101 can track the change of gaze of the user 100. This is explained using FIG. 4B-4C. Within a 3D viewing area 501, user 100 can focus at different areas at different times as explained earlier. When the gaze of the user changes location from I-I'-J-J' to K-K'-L-L', the location of the video feed that needs to be high-definition also changes. This change of gaze of the user 100 is tracked using various sensors as explained earlier. Based on this change of location, only a portion of the high resolution video captured by the high resolution camera 201 is transmitted to the head mounted display 101. Thus, using a gaze tracking system further reduces the amount of bandwidth required for providing a high resolution telepresence virtual reality system.

As per yet another embodiment of the present invention, the part of the area 501 within the 3D viewing range of the user 100 is provided with a higher resolution video feed compared to video feeds for rest of the 360 degree viewing area. Within the 3D viewing area 501, the area 504, where the focus of the user 100 is provided with high resolution video feed. Multiple similar combinations can also be possible, where the total viewing range in the direction of the user 100 can be provided with a low resolution video feed, whereas the area of the 360 degree present at the back of the user 100 is not provided with any video feed. Various such combinations can be done to enhance the viewing experience of the user 100 and to reduce the bandwidth requirements. As per yet another embodiment of the present invention, the telepresence system can detect the available bandwidth and choose between various resolutions of video feeds for various viewing areas of the user 100.

Figure 5A:
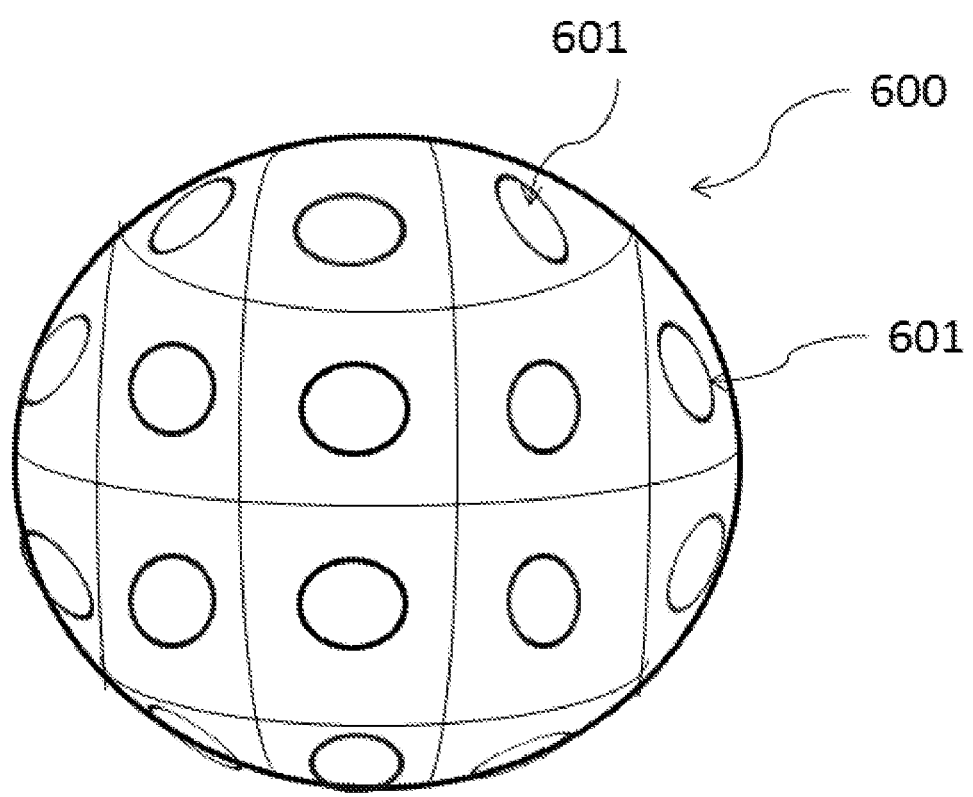
FIG. 5A illustrates an exemplary camera system.

As per yet another embodiment of the present invention, the telepresence system has a camera system 600 that have multiple cameras capable to capture videos at different resolutions. FIG. 5A illustrates an exemplary camera system 600. As shown in the figure, the camera system 600 has multiple cameras 601 facing different directions. Video captured by all of these cameras 601 is stitched together to give an overall 360 degree view of a remote location. Each of the cameras is designed to switch between capturing videos at different resolutions. The switch can be made using software or hardware means. It must be noted that structure and design of the camera system shown in this embodiment is merely a non-limiting example of the 360 degree capturing cameras already available in the market.

Figure 6A:
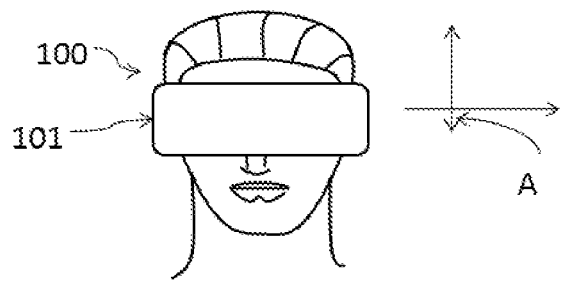
FIG. 6A-6C are illustrations of a telepresence system as per yet another embodiment of the present invention, where based on the head movement, new cameras are selected to record in high resolution.
Figure 6A:
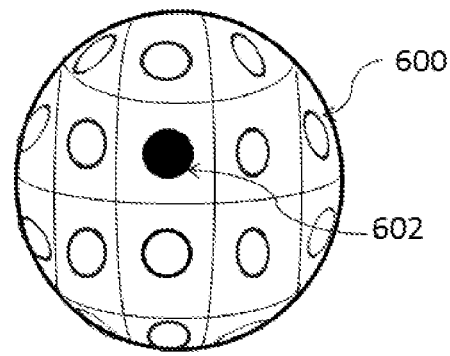
Figure 6B:
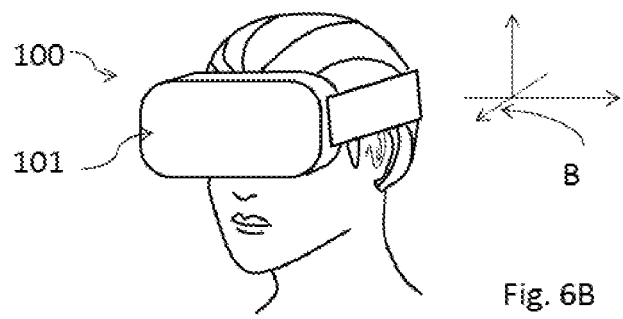
Figure 6B:
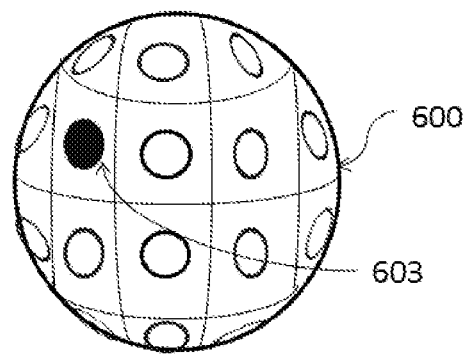
Figure 6C:
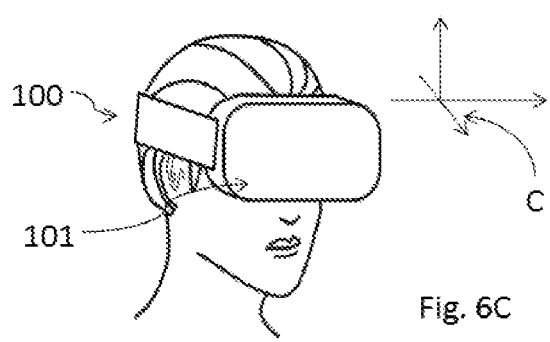
Figure 6C:
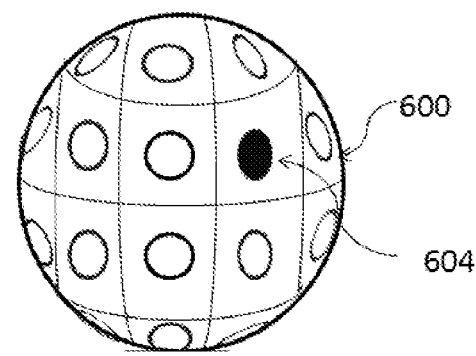

FIG. 6A-6C is illustrates a telepresence system as per yet another embodiment of the present invention using the camera system 600. The camera system 600 can communicate 360 degree live video to a head mounted display 101 either directly or through a server as mentioned in earlier embodiments. The head mounted display 101 can detect the direction of the head of the user 100. Based on that direction, one of the cameras 602 is selected to capture videos in high resolution whereas rest of the cameras 601 continues to capture video in low resolution. Combining the video feed from all the cameras of the camera system 600, a 360 degree video of the remote location is created. When the head of the user 100 is facing direction A, a camera 602 is selected to capture video in high resolution. Whereas when the user 100 moves head towards direction B, another camera 603 is selected to capture videos in high definition. Similarly, when the user 100 moves its head towards direction C, another camera 604 is selected to capture images in high definition. When the user 100 looks up, camera 601 capturing that portion of the 360 degree view is switched to capture images in high definition. Thus, based on the direction of the user's head, different cameras 601 are selected from the camera system 600 to capture in high definition. Videos from all the cameras are then stitched together and thus, user 100 is provided with a high resolution live video feed experience at a lesser bandwidth.

As per yet another embodiment of the present invention, more than one camera is selected to capture images in high definition, whereas some of the cameras 601 are instructed not to capture video at all. Various such permutation and combination of the cameras 601 can also be possible based on the user experience and the available bandwidth.

Figure 7A:
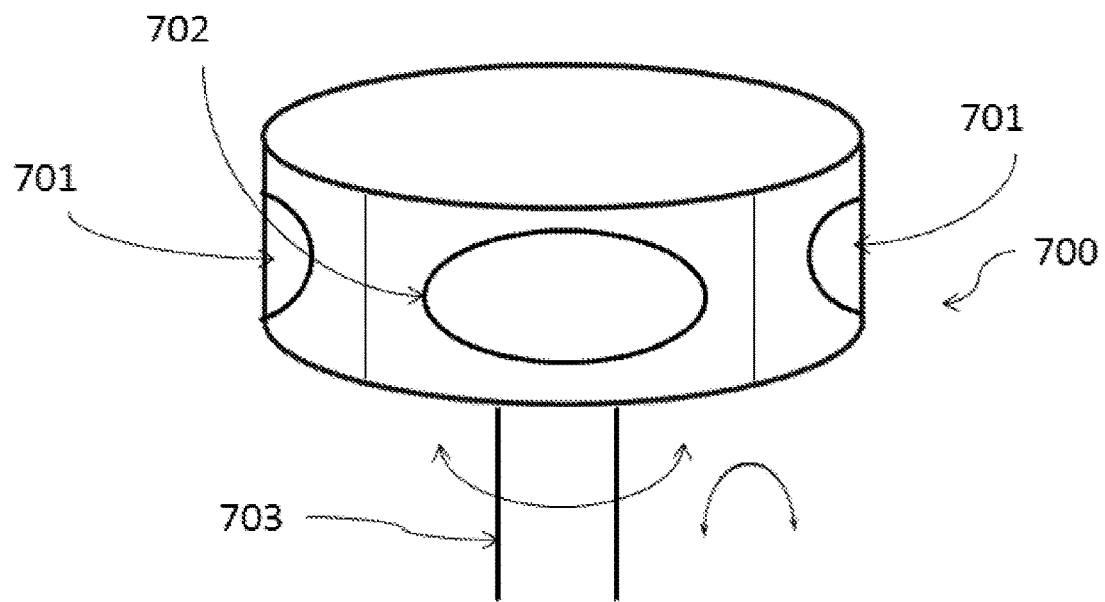
FIG. 7A-7B are illustrations of a telepresence system as per yet another embodiment of the present invention implementing a different camera system.

As per yet another embodiment of the present invention the telepresence system comprises a camera system that can rotate, adjust height and can bend automatically. FIG. 7A illustrates a camera system 700 that is provided with multiple cameras 701 out of which one camera 702 is designed to capture video in high definition. Video captured by the cameras 701 and high resolution camera 702 are stitched together to create a live video a remote location. The high resolution camera 702 is designed to capture video in the direction of the head of the user 100. When user changes its head direction, the camera system 700 rotates in such a way that the field of view of the high resolution camera 702 is aligned with the viewing direction of the user 100.

Figure 7B:
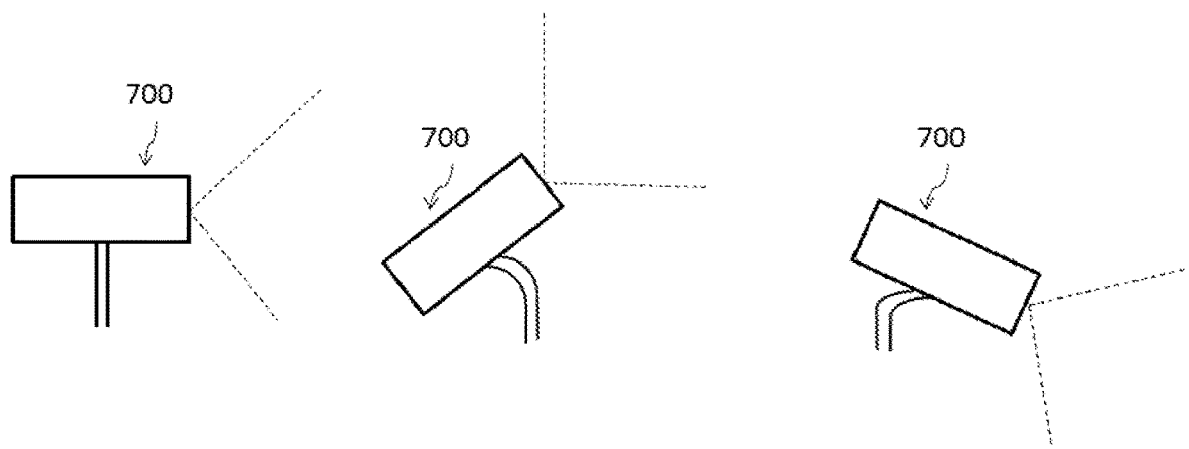

Similarly, when the user 100 moves head up or down, the camera system 700 can bend upwards or downwards to make the field of view of the HD camera 702 aligned with the direction of the user's head. This is explained using FIG. 7B. The camera system 700 can bend upwards or downwards based on the head movement of the user 100. The head movement can be tracked by various sensors present in the head mounted display as explained earlier.

While the invention has been presented with specific embodiments to monitor the height, gaze, direction, location, movement, etc of the user, it is to be understood that there are many alternatives in the art that are capable of obtaining the same information. These alternatives or variations will become apparent to those skilled in the art.

It will now be readily appreciated that the present invention may be used to advantageously send high definition video images to other types of virtual reality displays other than head mounted displays with lesser bandwidth. Also, it should now be understood that the invention can also be sued to provide high definition videos to different types of telepresence systems not limiting to but including teleconferencing systems, remote surveillance systems etc.

The invention claimed is:

1. A telepresence system comprising:
a head mounted display;
a camera system comprising plurality of cameras;
wherein the camera system provides captures images of a remote location;
wherein at least one camera pointing to the gaze direction has a higher resolution and other camera or cameras pointing to the other directions has a lower resolution than the gaze direction to provide the images forming the background; and
wherein the higher resolution camera is always aligned to capture images in a direction in which the head mounted display is facing, when the user changes his gaze or moves his head, the camera pointing to the gaze direction updates the user's image from lower resolution to higher resolution over a period of time.

2. The telepresence system as claimed in claim 1 wherein the head mounted display further comprises of sensors to detect head position and direction of a user of the head mounted display.

3. The telepresence system as claimed in claim 1 wherein the head mounted display further comprises of sensors to detect gaze direction of a user of the head mounted display.

4. The telepresence system as claimed in claim 1 wherein the head mounted display provides a nearly 360 degree view of the remote location.

5. The telepresence system as claimed in claim 4 wherein only part of the 360 degree view is provided in higher resolution.

6. The telepresence system as claimed in claim 4 wherein only part of the 360 degree view where a user is viewing is provided in higher resolution.

7. The telepresence system as claimed in claim 2 wherein the higher resolution camera is aligned to the head direction of the user.

8. A telepresence system comprising:
a display system for displaying images to a user;
a gaze tracking system comprising at least one sensor to detect gaze direction of the user;
a camera system capable of capturing images of a remote location and transmitting the images over a network to the display system;
wherein the camera system only transmits images in higher resolution in the user's gaze direction, when the user changes his gaze direction, the camera pointing to the gaze direction updates the user's image transmission to the display system from lower resolution to higher resolution over a period of time.

9. The telepresence system as claimed in claim 8 wherein the camera system comprises of multiple cameras.

10. The telepresence system as claimed in claim 9 wherein out of multiple cameras at least one camera is selected to capture images in higher resolution.

11. The telepresence system in claim 10, the at least one camera is selected based on gaze direction of the user.

12. The telepresence system in claim 9, the gaze direction of the user is detected by at least one sensor present in the head mounted display.

13. A method of providing images of a remote location to a user, the method comprising:
plurality of cameras capturing images of the remote location;
detecting gaze direction of the user;
wherein at least one camera pointing to the gaze direction has a higher resolution and other camera or cameras pointing to the other directions has a lower resolution than the gaze direction to provide the images forming the background; and
wherein the higher resolution camera is always aligned to capture images in a direction in which the head mounted display is facing, when the user changes his gaze or moves his head, the camera pointing to the gaze direction updates the user's image from lower resolution to higher resolution over a period of time.

14. The method as in claim 13, wherein the at least one camera moves in accordance with movement of the user's gaze.

15. The method as in claim 13, wherein images captured by all the cameras are stitched together to create live video of the remote location, wherein a part of the live video is in higher resolution and others are in lower resolution.

16. The method as in claim 15, where in location of the higher resolution part of the live video changes based on gaze of the user.

17. The method as in claim 15, where in location of the higher resolution part of the live video changes based on head direction of the user.

18. A telepresence system comprising:
a display system for displaying images to a user;
a gaze tracking system comprising at least one sensor to detect gaze direction of the user;
a camera system consisting of plurality of high resolution cameras capable of capturing images of a remote location and transmitting the images over a network to the display system;

wherein the camera system captures images in higher resolution in the user's gaze direction, the camera or cameras in the other directions sends or send images in lower resolution than said gaze direction, when the user changes his gaze direction, the camera pointing to the gaze direction updates the user's image transmission to the display system from lower resolution to higher resolution over a period of time.

* * * * *